United States Patent [19]
Rahmel et al.

[11] Patent Number: 5,659,421
[45] Date of Patent: Aug. 19, 1997

[54] SLIDE POSITIONING AND HOLDING DEVICE

[75] Inventors: Richard J. Rahmel, Monroe; Leonid Strinkovsky, Spring Valley, both of N.Y.

[73] Assignee: Neuromedical Systems, Inc., Suffern, N.Y.

[21] Appl. No.: 498,321

[22] Filed: Jul. 5, 1995

[51] Int. Cl.⁶ .................................................. G02B 21/26
[52] U.S. Cl. ............................................ 359/391; 359/393
[58] Field of Search .................................... 359/391–398

[56] References Cited

U.S. PATENT DOCUMENTS 3,951,512  4/1976  Tolles ...................................... 359/391
4,807,984  2/1989  Kurimura et al. ...................... 359/393
5,367,401  11/1994  Saulietis ................................. 359/398

FOREIGN PATENT DOCUMENTS

WO92/04651  3/1992  WIPO ..................................... 359/391

Primary Examiner—Timothy P. Callahan
Assistant Examiner—Kenneth B. Wells
Attorney, Agent, or Firm—Renner, Otto, Boisselle & Sklar

[57] ABSTRACT

A slide positioning and holding device includes a base, a number of first bearing members defining a bearing surface for slidably engaging a first edge of the slide, at least one second bearing member for slidably engaging a second edge of the slide generally perpendicular to the first edge, and first and second arms for contact with third and fourth edges, respectively, of the slide to urge the first and second edges of the slide into contact with the bearing members.

23 Claims, 3 Drawing Sheets

SLIDE POSITIONING AND HOLDING DEVICE

FIELD OF THE INVENTION

This invention relates generally to a device for positioning and holding a specimen in place and particularly to a device for use with an automated stage for positioning and holding in position a slide after the slide has been placed on the automated stage.

BACKGROUND OF THE INVENTION

Positioning mechanisms are known for holding a specimen, a slide or like item (hereinafter slide) in a known position relative to a viewing apparatus, such as a microscope. In some instances these mechanisms are incorporated into the stage of an automated microscope so that the slide may be moved with the stage relative to the viewing field of the microscope. However, often these mechanisms do not repeatably hold the slide in the same precise location on the stage. Where it is desirable to view the slide through the microscope on more than one occasion or to view the slide on different microscopes, repeatability of positioning of the slide relative to the microscope may be of particular importance. For example, in some automated or semi-automated specimen analysis devices, locations of interest on a slide may be recorded by their coordinates for later review on the same device or on another device, such as a device devoted to review. In such devices if the slide is not repeatably and accurately positioned, it may be difficult to find the locations sought for further review once the slide has been removed from the device and reinserted in the same or a different device. It is also desirable that a positioning mechanism be capable of accommodating and facilitating the automated loading and removal of the slide from the stage, for example, by a robot arm.

SUMMARY OF THE INVENTION

The present invention relates to a slide positioning device preferably including bearings for contacting the slide on two edges and a pair of arms biased toward the slide for urging the slide into a correct position on the stage. The arms preferably interact with the microscope so that as the stage moves into place under the viewing optics of the microscope, the slide is locked into position and as the stage is moved away from the viewing optics, such as to remove the slide from the stage, the arms disengage the slide.

In accordance with one aspect of the invention, a slide positioning and holding device includes a base, a number of first bearing members defining a bearing surface for slidably engaging a first edge of the slide, at least one second bearing member for slidably engaging a second edge of the slide generally perpendicular to the first edge, and first and second arms for contact with third and fourth edges, respectively, of the slide to urge the first and second edges of the slide into contact with the bearing members.

In accordance with another aspect of the invention, a device for holding a slide in a known position relative to a viewing apparatus includes a base movable relative to the viewing apparatus, at least two bearing members arranged on the base for constraining the slide in two generally perpendicular directions, and first and second arms, each having a contacting end for contacting an edge of the slide to urge the slide toward the bearing members, each of the arms being rotatably mounted to the base at a point between the contacting end and a distal end and being operable to contact a projection fixed relative to the viewing apparatus to cause the arms to rotate away from contact with the slide as the base is moved to a position away from the field of view of the viewing apparatus.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

DETAILED DESCRIPTION OF THE PREFERRED EMBODIMENTS OF THE INVENTION

Figure 1:
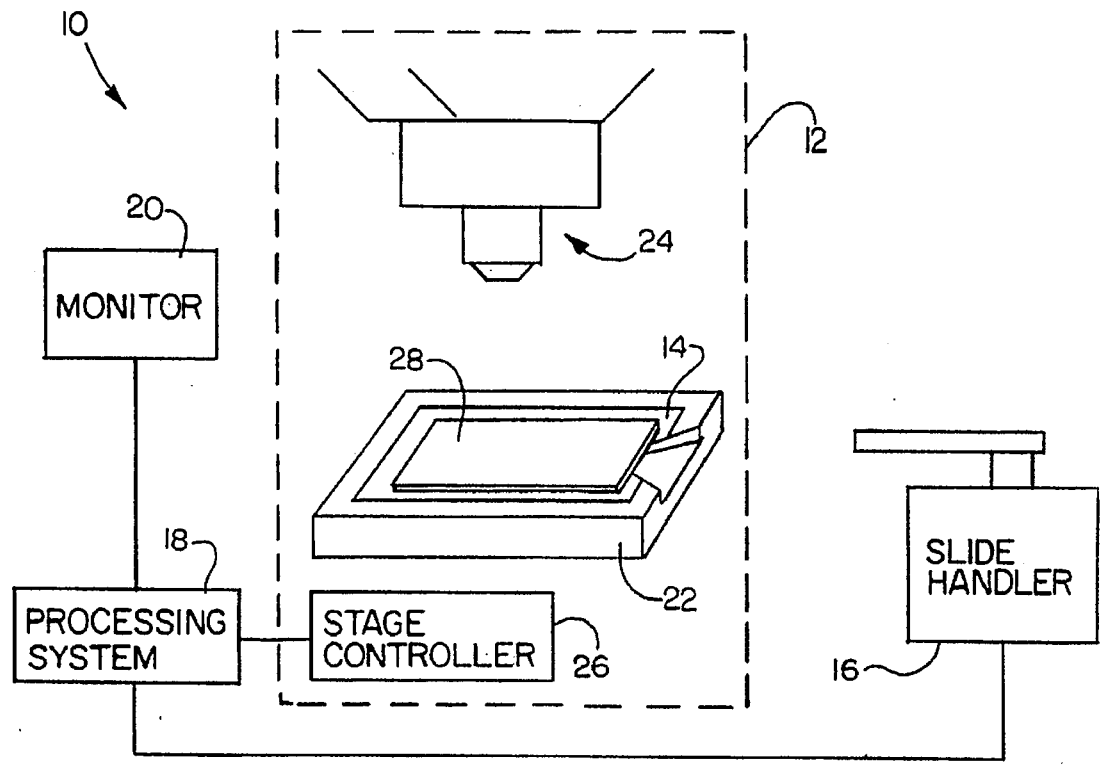
FIG. 1 is a schematic illustration of an exemplary specimen classification system including the slide positioning device of the present invention.

With reference to the figures and initially to FIG. 1, there is shown a specimen classification system 10 including an automated microscope 12 employing the slide positioning device 14 of the present invention. The specimen classification system 10 may include a robotic slide handler 16 for delivering specimen slides to and removing specimen slides from the positioning device 14, a processing system 18 for controlling the overall system and performing classification functions and a display monitor 20, such as for displaying portions of the specimen, as well as additional components not shown. A number of exemplary specimen classification systems are disclosed in co-owned U.S. Pat. Nos. 5,287,272 and 4,965,725 and U.S. patent application Ser. Nos. 07/425,665 and 07/502,611, the entire disclosures of which are incorporated by this reference. One such commercial specimen classification system is produced by Neuromedical Systems, Inc.® of Suffern, N.Y. under trademark PAPNET®.

The automated microscope 12 includes a base 22 upon which a movable stage is mounted, appropriate viewing optics 24 and a controller 26 for controlling the movement of the motorized stage, typically in response to a command from the processing system 18. The automated microscope may also include automated apparatus for focussing, for changing lens objectives in the viewing optics between high and low power, and for adjustment of the light incident on the slide. An example of a microscope performing at least some of these functions is manufactured by Carl Zeiss, Inc. of Germany, and a suitable motorized stage is manufactured by Ludl Electric Products, Ltd. of Hawthorne, N.Y. The slide positioning device 14 is preferably mounted to the movable stage 22 as an insert or otherwise positioned relative to the stage so as to move with the stage. In this manner the slide positioning device 14 and the slide 28 positioned thereon are movable with respect to the viewing optics 24 of the microscope so that discrete and known areas of material on the slide may be viewed through the microscope.

It is noted that while the invention is described herein with respect to a specimen classification system employing an automated microscope for viewing material on the slide, it will be appreciated that this application is but an example and that the invention may be used in other applications in which it is desirable to accurately position a slide or the like. Further it will be understood that the positioning device is suitable for the positioning of many objects, the word "slide" being meant to include slides and all other objects to which a specimen may be affixed.

Figure 2:
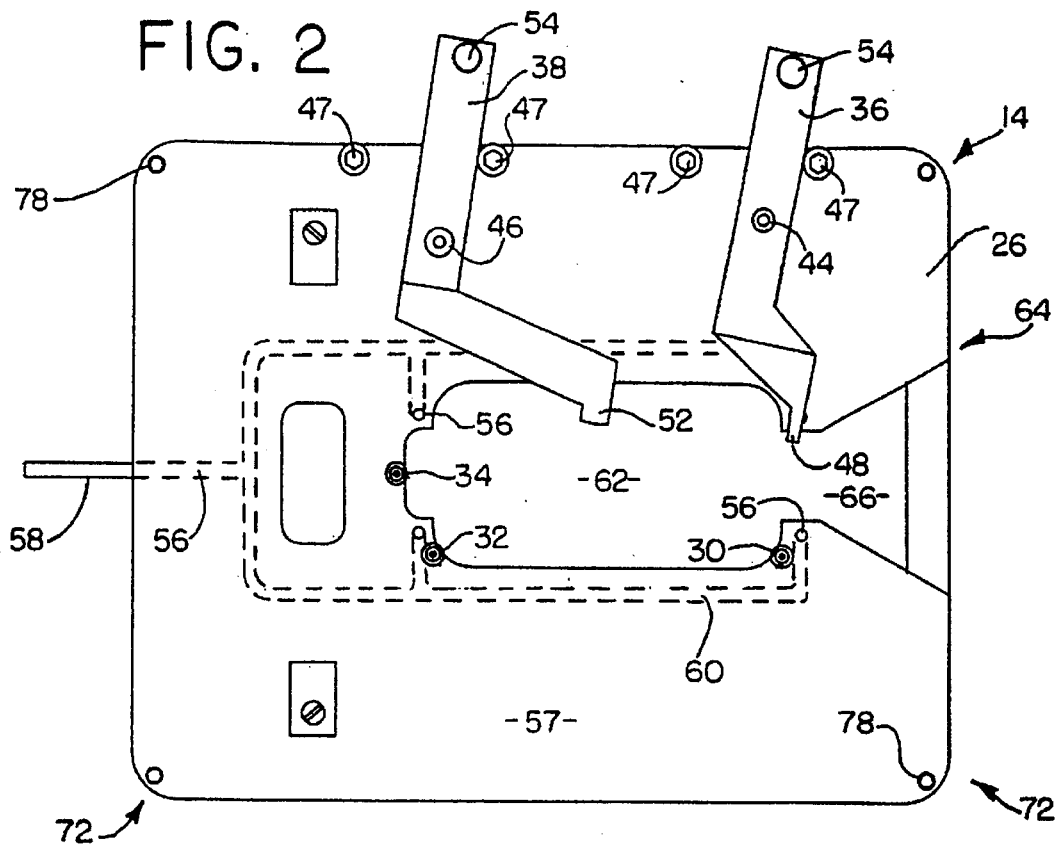
FIG. 2 is a top view of the slide positioning device without a slide in place.
Figure 3:
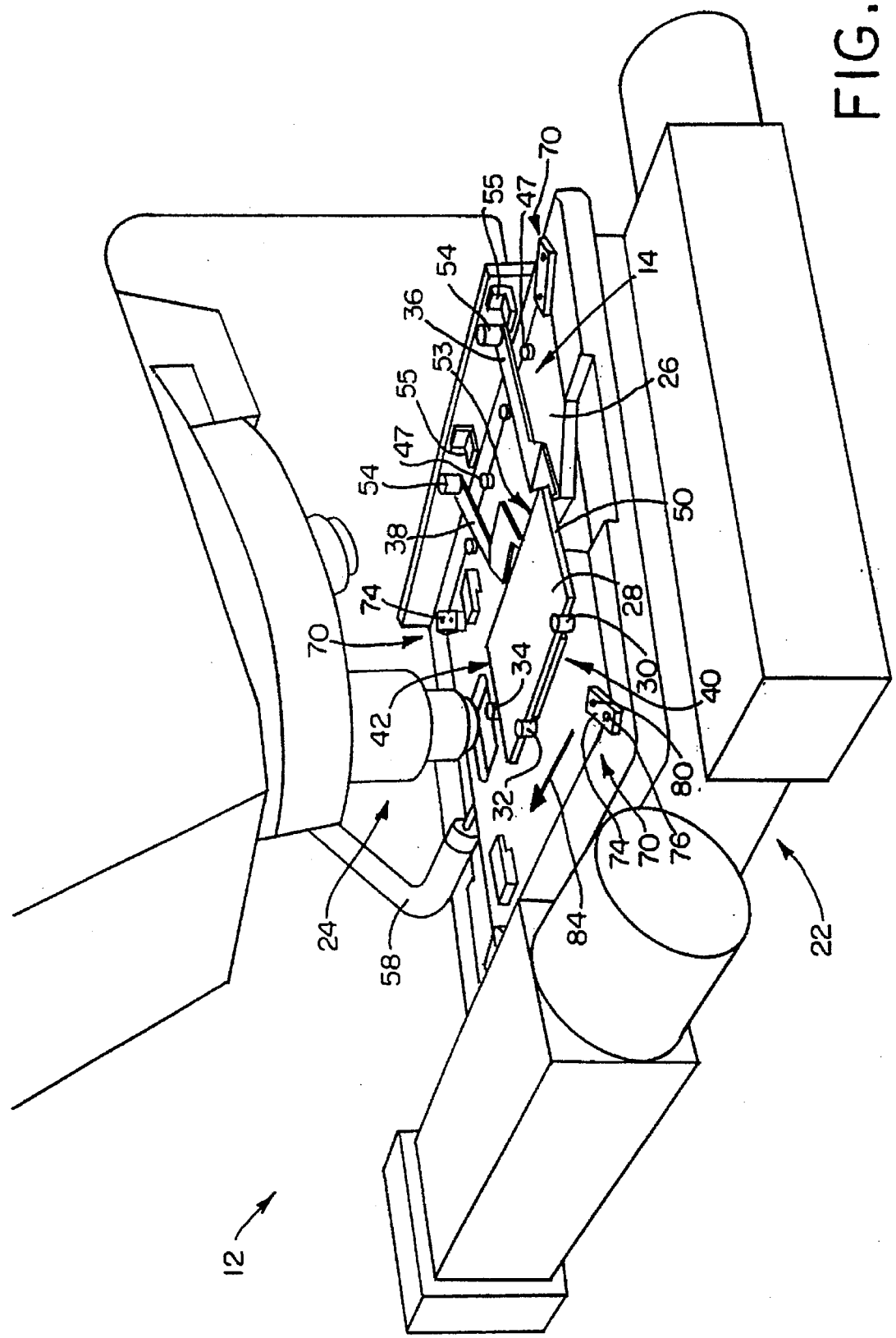
FIG. 3 is a view of the automated microscope with the slide positioning device mounted to the movable stage and holding a slide.
Figure 4:
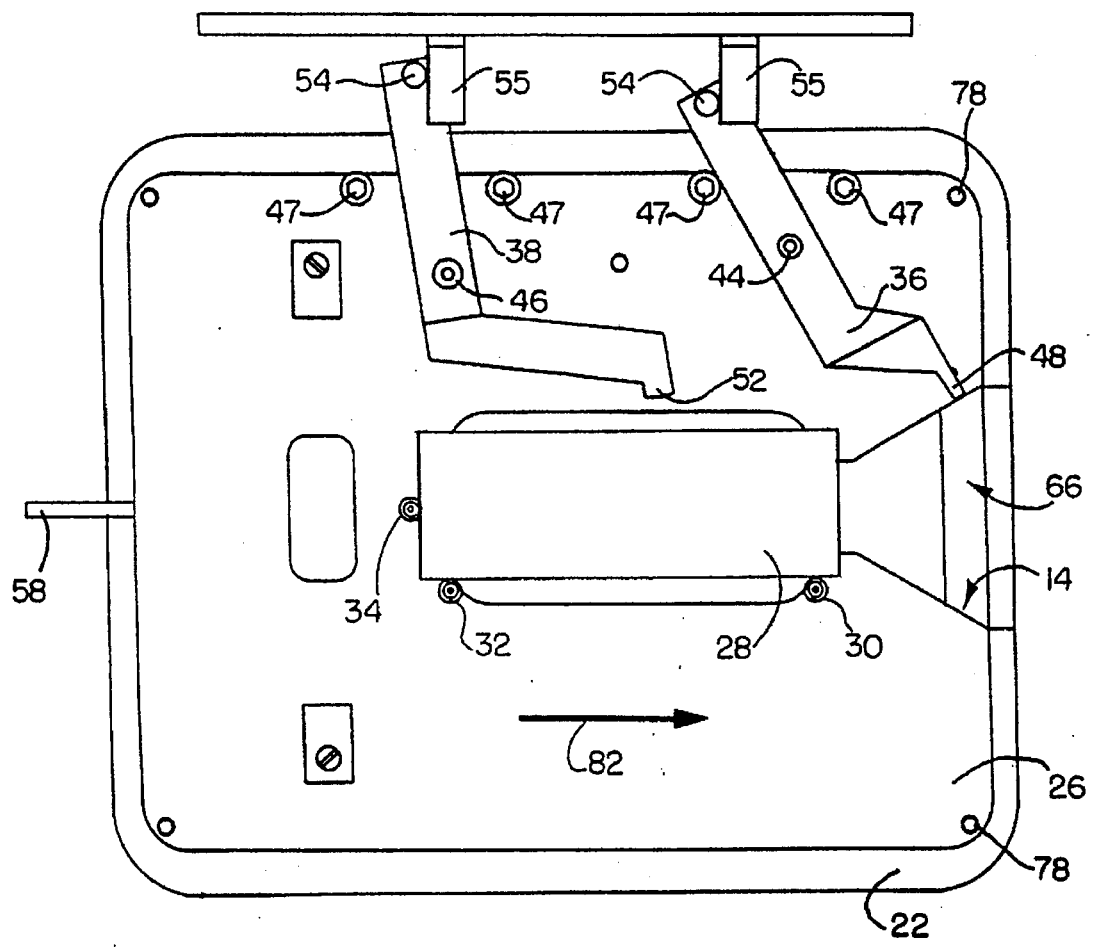
FIG. 4 is a partial top view of the stage and slide positioning device with a slide in position on the slide positioning device but not held in place.

The slide positioning device 14 is shown in detail in FIGS. 2 through 4. The slide positioning device 14 includes a base 26 upon which the slide 28 (shown in FIGS. 3 and 4) is placed and to which are mounted a number of bearings 30, 32 and 34 and a pair of lever arms 36 and 38 for contacting edges of the slide and for urging the slide towards the bearings. The bearings 30, 32 and 34 and the lever arms 36 and 38 cooperate to accurately and repeatably position the slide 28 on the positioning device 14. The beatings 30, 32 and 34 are preferably journal bearings extending upwardly from the base 26 sufficiently to provide for adequate contact with the edges of the slide 28 and to permit the slide 28 to move or slide easily relative to the position of the bearings. The pair of bearings 30 and 32 define a bearing surface supporting one long edge 40 of the slide 28 while the bearing 34 supports the end edge 42 of the slide perpendicular to the long edge 40.

The lever arms 36 and 38 are pivotally mounted to the base 26 and pivot about respective mounting assemblies 44 and 46. The lever arms 36 and 38 are biased, such as through the use of springs contained within the mounting assemblies 44 and 46, to rotate toward the center of the slide positioning device 14 and toward the slide 28 as can be seen most clearly in FIG. 2 in which there is no slide in place to prevent full rotation of the lever arms. A pair of stops 47 corresponding to each lever arm 36, 38 project from the base 26 to prevent excessive rotation of the lever arms in either rotational direction.

Consequently, when free to rotate in their directions of bias and when a slide 28 is in position on the slide positioning device 14, as shown in FIG. 3, a finger 48 of the lever arm 36 will contact the end edge 50 of the slide 28 opposite the bearing 34 to urge the slide toward the bearing while a finger 52 of the lever arm 38 will contact the long edge 53 of the slide opposite the bearings 30 and 32 to tend to urge the slide toward the bearings 30 and 32. Opposite the fingers 48 and 52, the lever arms 36 and 38, respectively, include contacts 54 for contact with projections 55 fixed relative to the viewing optics 24 of the automated microscope. The contacts 54, the projections 55, the biasing of the lever arms 36 and 38 and the position of the slide positioning device 14 and movable stage 22 relative to the viewing optics 24, determine the position of the lever arms and whether the lever arms are free to rotate about their respective mounting assemblies 44 and 46 to urge the slide 28 into correct position or whether the arms are drawn away from the slide 28 to permit insertion and removal of the slide, as is discussed more fully below.

As shown in FIG. 2, the slide positioning device 14 includes a number of vacuum ports 56 which open to the top surface 57 of the base 26 confronting the slide 28 when in place on the device. The vacuum ports 56 are connected to a source of negative pressure by the supply line 58 through a series of passages or channels 60 suitably formed in the base 26. Application of a negative pressure to the vacuum ports 56 draws the slide 28 against the top surface 57 of the base 26 holding the slide 28 in position for viewing by the viewing optics 24 of the microscope while release of the negative pressure to the vacuum ports releases the slide such as prior to retrieval by the robotic slide handler 16.

A generally rounded rectangular open area 62 located generally in the center of the base 26 is provided in the base to permit the slide 28 to be illuminated from below or to allow for use with a laser scanner or similar viewing or scanning device. At the end 64 of the slide positioning device 14 facing the robotic slide handler 16, the open area 62 joins a divergent area 66 which facilitates the automated placement and removal of the slide on or from the top surface 57 of the base 26, such as by an arm of the robotic slide handler 16 (FIG. 1).

The slide positioning device 14 preferably fits within a recess in the movable stage 22, as seen in FIG. 3, and is positioned perpendicular to the viewing optics 24 through mounting assemblies 70 in each of the four corners 72 of the slide positioning device. Each mounting assembly 70 includes a flange 74 firmly mounted to the movable stage 22, such as by screws 76, which extends over an adjustment hole 78 in a corresponding corner 72 of the base 26 of the slide positioning device 14 (FIGS. 2 and 4). A fine threaded leveling screw 80 extends through the flange 74, distal the connection to the movable stage 22, where it threadedly engages an adjustment hole 78. Adjustment of each of the fine leveling screws 80 permits the slide positioning device 14 and slide 28 mounted thereon to be accurately positioned perpendicular to the viewing optics 24.

In operation in the exemplary specimen classification system 10, in order to receive a slide 28 for classification or permit removal of a classified slide, the processing system 18 instructs the stage controller 26 to shift the slide positioning device 14 and movable stage 22 away from the viewing field 24 of the microscope in the direction of arrow 82, as shown in FIG. 4. In this position, the slide positioning device 14 and movable stage 22 have been moved to an extent that the contacts 54 of the lever arms 36 and 38 have contacted the projections 55 fixed relative to the viewing optics 24 which have caused the arms to rotate in a direction opposed to their biased direction and away from a slide 28 located on the slide positioning device 14. The vacuum ports 56 are then vented to atmosphere releasing the slide 28 from the top surface 57 of the slide positioning device 14. The robotic slide handler 26 is then instructed by the processing system 18 to remove the slide 28 from the base 26 of the slide positioning device 14 or to load a slide on the base through the divergent area 66.

Once the slide 28 has been loaded onto the slide positioning device 14, the processing system 18 instructs the stage controller 26 to shift the movable stage 22 and slide positioning device 14 back into position under the viewing optics 24. As the movable stage 22 moves back into this position in the direction of arrow 84 shown in FIG. 3, the mounting assemblies 44 and 46 move relative to the fixed projections 55 permitting the lever arms 36 and 38 to rotate in the direction of bias about their respective mounting assemblies to contact the slide 28, thus urging the slide into correct and accurate position against the bearings 30, 32 and 34. The vacuum ports 56 are then opened to the supply of negative pressure thus holding the slide 28 firmly to the top surface 57 of the slide positioning device 14 while viewing of the slide takes place.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

We claim:

1. A slide positioning and holding device, comprising:

a base movable relative to a viewing apparatus between a first position wherein the slide is viewable by the viewing apparatus and a second position;

a plurality of first bearing members defining a bearing surface for slidably engaging a first edge of the slide;

at least one second bearing member for slidably engaging a second edge of the slide generally perpendicular to the first slide edge; and, first and second arms for contact with third and fourth edges, respectively, of the slide to urge the first and second edges of the slide into contact with the bearing members when the base is in the first position;

wherein at least one of the arms is caused to move out of contact with the slide by an element fixed relative to the viewing apparatus when the base is moved toward the second position.

2. The device of claim 1, wherein the base includes vacuum ports on a surface confronting the slide for maintaining the slide in position on the base.

3. The device of claim 1, wherein the arms are biased to urge the slide toward the bearing members.

4. The device of claim 1, each of the arms being rotatably mounted to the base at a point between an end of each arm for contact with the slide and a distal end.

5. The device of claim 4, wherein the base is mounted to a movable stage.

6. The device of claim 1, wherein the base is mounted to a movable stage.

7. The device of claim 1, wherein the base is part of a movable stage.

8. The device of claim 1, wherein the second position is at a location which permits automated placement of the slide on the base.

9. A device for holding a slide in a known position relative to a viewing apparatus, comprising:

a base movable relative to the viewing apparatus;

at least two bearing members arranged on the base for constraining the slide in two generally perpendicular directions; and first and second arms, each having a contacting end for contacting an edge of the slide to urge the slide toward the bearing members, each of the arms being rotatably mounted to the base at a point between the contacting end and a distal end and at least one of the arms being operable to contact a projection fixed relative to the viewing apparatus to cause the arms to rotate away from contact with the slide as the base is moved to a position away from the field of view of the viewing apparatus.

10. The device of claim 9, wherein the base includes vacuum ports on a surface confronting the slide for maintaining the slide in position on the base.

11. The device of claim 9, wherein the arms are biased to urge the slide toward the bearing members.

12. The device of claim 9, wherein the base is mounted to a movable stage.

13. The device of claim 9, wherein the base is part of a movable stage.

14. The device of claim 9, wherein the base includes a opening facilitating the automated placement of the slide on the base.

15. The device of claim 9, wherein the viewing apparatus is a microscope.

16. The device of claim 9, wherein the viewing apparatus is a scanning laser.

17. The device of claim 9, the arms being operable to rotate to urge said slide towards said bearing members as the base is moved to a position in the field of view of the viewing apparatus.

18. The device of claim 17, wherein one of the arms contacts the slide and urges it towards a bearing member constraining the slide in one direction before the other arm contacts the slide and urges it towards a bearing member constraining the slide in the other direction.

19. A slide positioning and holding device, comprising:

a base movable relative to a viewing apparatus between a first position wherein the slide is viewable by the viewing apparatus and a second position;

a plurality of bearing members for constraining the slide in two generally perpendicular directions; and an arm for urging the slide toward at least one of the bearing members holding it in place when the base in the first position;

wherein the arm is caused to move out of contact with the slide by an element fixed relative to the viewing apparatus when the base is moved toward the second position.

20. The device of claim 19, wherein the arm is biased towards at least one of the bearing members.

21. The device of claim 19, wherein the arm is not in contact with the fixed element when the base is in the first position.

22. The device of claim 19, wherein the arm is in contact with the fixed element when the base is in the second position.

23. The device of claim 19, wherein the base is adapted to permit automated placement of the slide on the base.

* * * * *